United States Patent [19]

Shreve

[11] 4,280,752
[45] Jul. 28, 1981

[54] SOLID-MEDIUM COHERENT OPTICAL PROCESSOR

[75] Inventor: James S. Shreve, Fairfax, Va.

[73] Assignee: The United States of America as represented by the Secretary of the Army, Washington, D.C.

[21] Appl. No.: 19,031

[22] Filed: Mar. 9, 1979

[51] Int. Cl.³ .............................................. G02B 5/18
[52] U.S. Cl. ............................. 350/162 SF; 350/55; 350/294; 350/299
[58] Field of Search ................. 350/162 SF, 201, 299, 350/55, 294; 356/133

[56] References Cited

U.S. PATENT DOCUMENTS

| | | | |
|---|---|---|---|
| 3,438,693 | 4/1969 | Cook | 350/162 R |
| 3,578,846 | 5/1971 | Chen | 350/162 SF |
| 3,623,024 | 11/1971 | Hamilton | 350/162 SF |
| 3,752,564 | 8/1973 | Fletcher et al. | 350/162 SF |
| 4,111,531 | 9/1978 | Lavelle et al. | 350/299 |

Primary Examiner—Davis L. Willis
Assistant Examiner—Carolyn E. Fields
Attorney, Agent, or Firm—Nathan Edelberg; Robert P. Gibson; Saul Elbaum

[57] ABSTRACT

A coherent optical processor device comprised of a monolithic mass of transparent optical material. The device is built up of a plurality of modules, each having a curved reflective surface for performing a Fourier transform operation and a V-shaped reflective surface, for reflecting the beam and directing it to the next module. Plates or masks for changing the amplitude and/or phase of the beam may be inserted in air gaps between contiguous modules. The device provides absolute path length constancy, is not vulnerable to the adverse effects of dust, and minimizes the multiple reflections ordinarily produced at air-glass interfaces.

2 Claims, 1 Drawing Figure

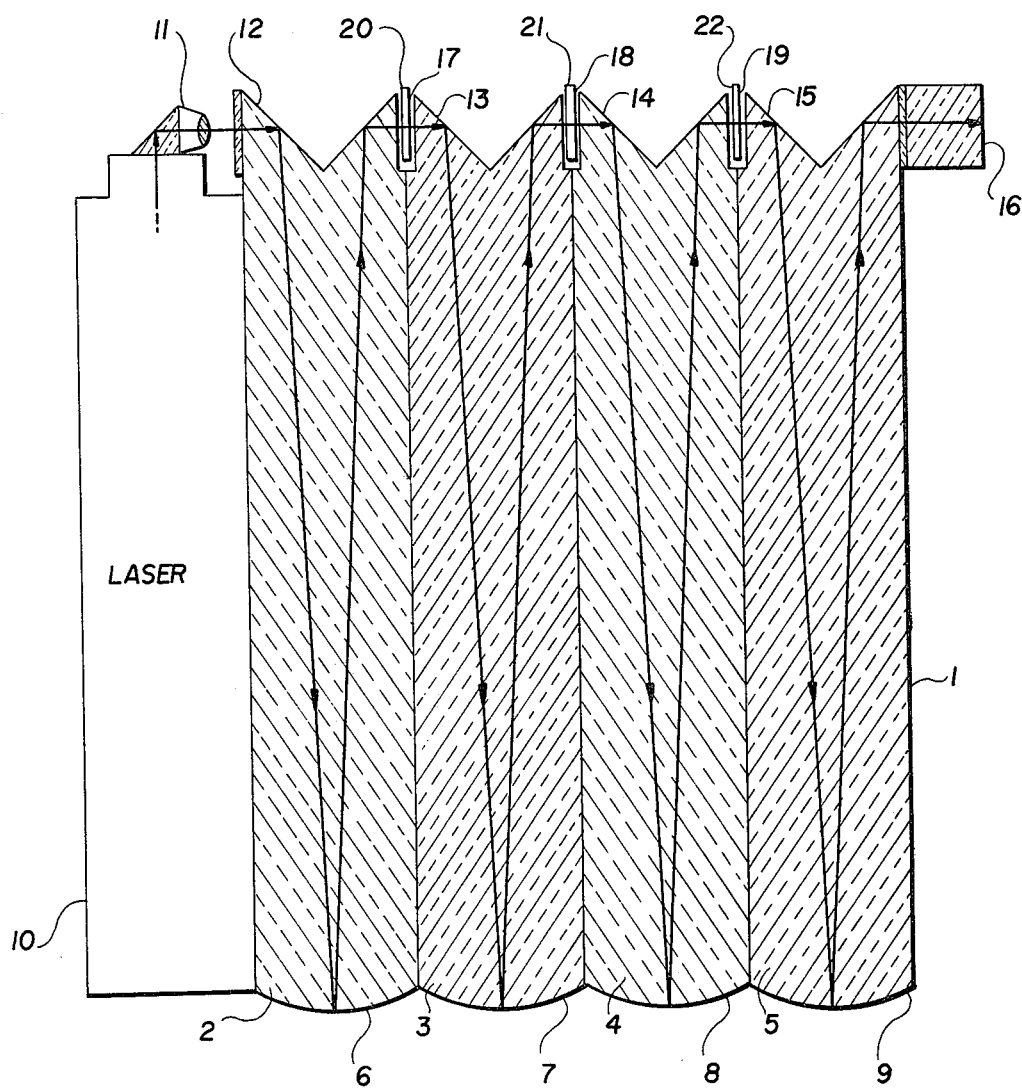

SOLID-MEDIUM COHERENT OPTICAL PROCESSOR

RIGHTS OF THE GOVERNMENT

The invention described herein may be manufactured, used, and licensed by or for the United States Government for governmental purposes without the payment to me of any royalty thereon.

The present invention is directed to an improved coherent optical processing device.

As is known, the art of coherent optical processing has grown in technological importance in recent years. For any given application, coherent optical processors of the prior art are generally implemented in the form of discrete optical elements, such as lenses, mirrors and plates, which are mounted at appropriate separations on a rigid base.

For the proper operation of the processor, it is extremely important that the various path lengths between the optical elements of the system remain constant. This requirement is so critical that relative path length changes between signal beam and reference beam must not be in excess of a fraction of a wavelength of the laser source (about 0.0006 mm) for the interval in which a set of data frames is taken. Hence, with prior art coherent processors, vibration presents a problem, as even the slightest vibration can change optical path lengths enough to interfere with the proper functioning of the processor.

A second problem with prior art, discrete-element optical processors is that they are not sufficiently resistant to dust. Thus, dust pervades even enclosed processors, and undermines operation, as processor outputs often exhibit the Fourier transform of one or more large dust particles that have settled on lens or mirror elements.

A still further problem which exists with prior art optical processors is the existence of numerous air-glass interfaces. Multiple reflections exist at these interfaces, which result in the formation of unwanted interference patterns.

It is therefore an object of the present invention to provide an optical processor device which has absolute path-length constancy, regardless of vibration.

It is a further object of the invention to provide an optical processor device which is less susceptible to interference from dust.

It is still a further object of the invention to provide an optical processing device which minimizes the number of air-solid medium interfaces, and therefore avoids problems due to multiple reflections at such interfaces.

It is still a further object of the invention to provide an optical processor device which is compact and easy to manufacture, and which flexibly adapts itself to different processing applications.

In accordance with invention, the above objects are accomplished by providing an optical processor device which is constructed of a monolithic mass of transparent material. The mass of transparent material has one surface formed as a plurality of contiguous curved reflective sub-surfaces and the opposing surface formed as a plurality of contiguous V-shaped reflective sub-surfaces. The contiguous V-shaped sub-surfaces have air gaps therebetween, for the placement of plates or masks. The curved sub-surfaces act as concave mirrors for beams traveling within the mass, and act as Fourier transforming elements. The plates or masks which may be placed in the air gaps are constructed to change the amplitude and/or phase of a beam traveling therethrough. The combination of the plates or masks and the Fourier transforming elements provides a structure which can flexibly be "programmed" for many different coherent processing applications.

The invention will be better understood by referring to the accompanying drawing, which is a pictorial illustration of the device.

Referring to the FIGURE, it is seen that the device is comprised of a monolithic mass of optical material 1. This mass may readily be fabricated from lenses, prisms, and the like cemented together, or otherwise could be shaped from a single block of transparent material.

One of the surfaces of the device, in the FIGURE the lower surface, is comprised of a plurality of curved sub-surfaces 6, 7, 8, and 9. Each of these sub-surfaces is arranged to be reflective, either by the application of a reflective coating, or by other means known to those skilled in the art. Each curved reflective surface is a concave mirror and a Fourier transforming element for beams traveling within the interior of the mass which are reflected off of the sub-surfaces. The device is thus seen to be comprised of a plurality of Fourier transform "building blocks" 2, 3, 4, and 5. The device is not limited to four such "building blocks", or modules as shown in the FIGURE but rather may be comprised of any arbitrary number of such modules. As mentioned above, the device may be fabricated by securing individual modules 2, 3, 4, and 5 to each other along the common surfaces, or in the alternative, the device may be fashioned from a single solid block of transparent material.

As shown in the FIGURE, the surface opposing the plurality of contiguous curved sub-surfaces is comprised of a plurality of contiguous V-shaped sub-surfaces, 12, 13, 14, and 15, each V-shaped sub-surface being opposite and corresponding to a curved sub-surface. At least some of the contiguous V-shaped sub-surfaces have air gaps therebetween, and these are shown at 17, 18, 19 of the FIGURE. Moveable or stationary plates or masks can be inserted in these air gaps for changing the amplitude and/or phase of the beam traveling therethrough, and such plates or masks are shown at 20, 21, and 22 of the FIGURE. The plates and/or masks may be for instance transparencies, and the exact structure thereof is known to those skilled in the art, and forms no part of the present invention. In the particular device illustrated, plate or mask 21, is built into the device as a non-removeable permanent mask, and in certain applications this may be desirable, while in other applications, it may be desirable to use only removeable type plates or masks.

A laser 10, may be mounted to be integral with the input end of the device, as shown in FIGURE. The output of the laser is at 11, and if both signal and reference beams are desired, then another beam may be arranged to enter the input end of the device parallel to the beam shown but behind or in front of the plane of the paper. The beam path is illustrated, and the beam is seen to successively traverse the modules 2, 3, 4, and 5 of the device, and alternately encounter the Fourier transforming elements and the masks. As will be apparent to those skilled in the art, such an arrangement is an extremely convenient one for effecting many coherent processing applications, such as for instance those involving convolution or correlation of images. The device may be "programmed" to perform any desired application by the insertion of appropriate plates or masks in the air gaps 17, 18, and 19. These plates or masks effectively perform multiplication operations on the beams passing therethrough, accentuating different parts of the image, while the curved reflective elements then take the Fourier transform of the resultant beam.

The rigidity of the device insures path length constancy regardless of whether or not vibration is present. Due to the integral structure, there is little opportunity for dust to enter the system. The number of air-solid medium interfaces is few compared with a coherent processor using discrete optical elements, and the optical path is constrained to lie mostly within the integral structure, thereby minimizing multiple reflections.

Except for the laser, the device is shown in section in the FIGURE. The actual device would be a rectangular parallelepiped except for the curved and V-shaped sub-surfaces. The device may be made of any known transparent optical material, such as glass or plastic.

I wish it to be understood that I do not desire to be limited to the exact details of construction shown and described, for obvious modifications can be made by a person skilled in the art.

I claim:

1. A unitary coherent optical processor device made of a monolithic transparent medium comprising a solid mass of transparent material having one of its surfaces formed as a plurality of contiguous curved sub-surfaces, each curved sub-surface having a reflective coating disposed thereon whereby such sub-surfaces comprise concave mirror means for reflecting light beams travelling inside of said solid mass, said mass having the opposed surface thereof formed as a plurality of contiguous V-shaped sub-surfaces, each of said curved and V-shaped sub-surfaces comprising reflecting means for constraining light beams to travel alternately between said respective V-shaped and curved sub-surfaces substantially entirely within the interior of said monolithic solid mass, said mass of material having a laser integral therewith, said laser being arranged to direct a light beam at its output end into an end-most one of said V-shaped sub-surfaces, wherein there is an air gap between at least one contiguous pair of said plurality of contiguous V-shaped sub-surfaces, and at least one of said air gaps has a plate or mask disposed therein, said plate or mask having the property of changing the amplitude and/or phase of a light beam traveling therethrough.

2. The processor device of claim 1 wherein said solid transparent material is comprised of a plurality of contiguous modules, each module having one of said curved sub-surfaces at one of its ends and one of said V-shaped sub-surfaces at the other of its ends.

* * * * *